(12) United States Patent
Kim et al.

(10) Patent No.: US 7,481,112 B2
(45) Date of Patent: Jan. 27, 2009

(54) SILICON INERTIAL SENSORS FORMED USING MEMS

(75) Inventors: Eun Sok Kim, Rancho Palos Verdes, CA (US); Qiang Zou, Alhambra, CA (US)

(73) Assignee: University of Southern California, Los Angeles, CA (US)

( * ) Notice: Subject to any disclaimer, the term of this patent is extended or adjusted under 35 U.S.C. 154(b) by 46 days.

(21) Appl. No.: 11/240,804

(22) Filed: Sep. 30, 2005

(65) Prior Publication Data

US 2007/0193353 A1 Aug. 23, 2007

Related U.S. Application Data

(60) Provisional application No. 60/614,909, filed on Sep. 30, 2004, provisional application No. 60/614,858, filed on Sep. 30, 2004.

(51) Int. Cl.
*G01P 15/12* (2006.01)
*G01P 9/04* (2006.01)

(52) U.S. Cl. .................... 73/514.33; 73/504.12

(58) Field of Classification Search ............. 73/504.12, 73/504.15, 504.16, 510, 514.33
See application file for complete search history.

(56) References Cited

U.S. PATENT DOCUMENTS

| 4,951,510 | A |   | 8/1990 | Holm-Kennedy et al. |
|---|---|---|---|---|
| 5,092,173 | A | * | 3/1992 | Aske ........................ 73/514.21 |
| 5,539,236 | A | * | 7/1996 | Kurtz et al. .................. 257/415 |
| 5,889,208 | A |   | 3/1999 | Nose |
| 6,263,735 | B1 | * | 7/2001 | Nakatani et al. ......... 73/514.36 |
| 6,389,899 | B1 |   | 5/2002 | Partridge et al. |
| 6,595,054 | B2 | * | 7/2003 | Paros et al. ............... 73/504.04 |
| 2003/0041668 | A1 |   | 3/2003 | Hulsing, II et al. |
| 2004/0016307 | A1 |   | 1/2004 | Albert |
| 2004/0025590 | A1 | * | 2/2004 | Schaad et al. ............ 73/514.29 |
| 2006/0225506 | A1 |   | 10/2006 | Madni et al. |

\* cited by examiner

*Primary Examiner*—John E Chapman
(74) *Attorney, Agent, or Firm*—Fish & Richardson P.C.

(57) ABSTRACT

A MEMS silicon inertial sensor formed of a mass that is supported and constrained to vibrate in only specified ways. The sensors can be separately optimized from the support, to adjust the sensitivity separate from the bandwidth. The sensor can sense three dimensionally, or can only sense in a single plane.

4 Claims, 9 Drawing Sheets

SILICON INERTIAL SENSORS FORMED USING MEMS

This application claims priority from provisional application Ser. Nos. 60/614,858 and 60/614,909, both filed Sep. 30, 2004, the contents of which are herewith incorporated by reference.

BACKGROUND

Inertial sensors are commonly used in many different applications including vehicle rollover sensors, aircraft sensors, and others. The sensors should be capable being used in many different environments, and be relatively ruggedized. In addition, it is important that the sensors produce output signals which are accurate. Various kinds of environmental noise, of various forms, may effect the accuracy of such sensors.

SUMMARY

The present application describes the formation of an inertial sensor on a silicon substrate, and in an embodiment is formed using Micro Electro Mechanical Systems or MEMS. An aspect disclosed herein describes mitigating the vibration susceptibility of the sensor. Another aspect describes three-dimensional sensors, and ways of isolating the different orthogonal axes of information.

DETAILED DESCRIPTION

The general structure and techniques, and more specific embodiments which can be used to effect different ways of carrying out the more general goals are described herein.

Figure 1A:
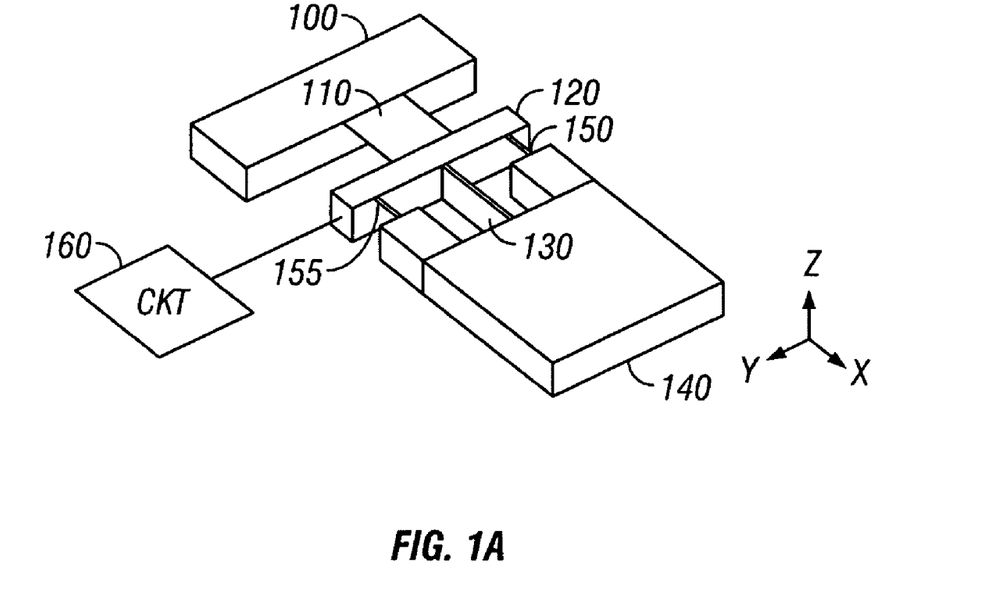
FIGS. 1a and 1b show respective views of an angular rate sensor of an embodiment.
Figure 1B:
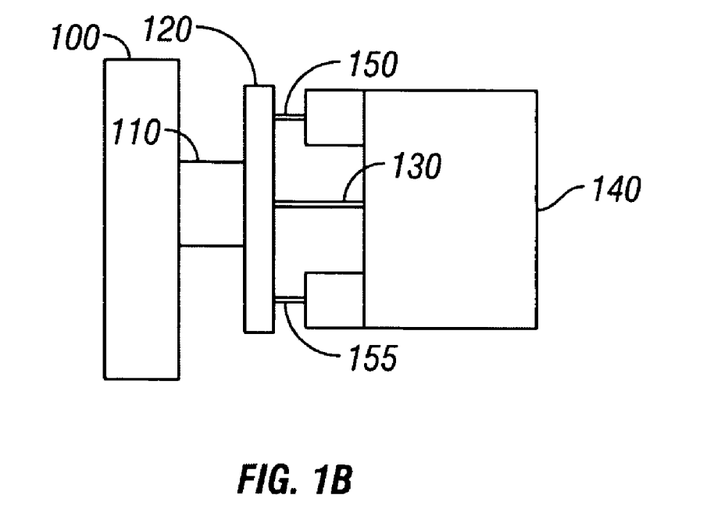
Figure 2:
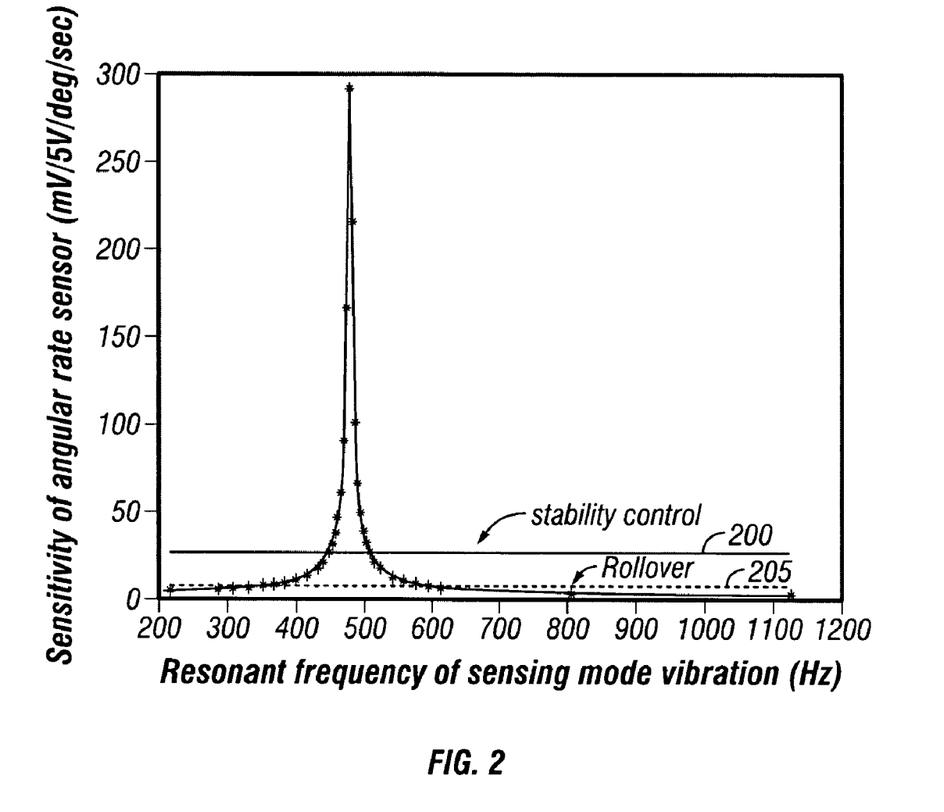
FIG. 2 shows the calculated sensitivity of the sensor as a function of resonant frequency.

An embodiment is shown in FIGS. 1 and 2. The embodiment uses piezo-based driving and sensing, which can be for example piezoelectric driving and piezoelectric or piezoresistive sensing. The rate sensor is formed of silicon, although alternative embodiments may use other semiconductor processable materials. The embodiment forms the sensors using a MEMS technique.

An anchor part 100 supports the entire silicon beam-mass structure, and acts as the support for the system. The driving element 110 may include a ZnO piezoelectric film deposited on a $Si_3N_4$ beam. In operation, actuating the driving element 110 causes the structure to vibrate in the vertical plane.

A decoupling island 120 may decouple the driving part 110 from the sensing parts, which includes a vertical beam 130, sensing elements 150, 155, and proof mass 140. The beam 130 connects to a connection surface of the proof mass which is along a surface of the proof mass that faces to the decoupling island. Other surfaces of the mass, which are closest to the edges of the mass, abut against the sensing elements.

Vertical supporting beam 130 is connected to the decoupling island 120 to support the proof mass 140, while allowing the proof mass to move in specified ways. The supporting beams such as 130 effectively forms springs. The supporting beams are columnar in shape, with a rectangular, non-square cross section that defines a thicker thickness, which is in the z direction in FIG. 1a, and a thinner thickness in the y direction in FIG. 1a. This allows the mass 140 to move in the y direction, thereby flexing the supporting beam 130. However, movement in the z direction and the x direction is constrained by the vertical beam 130.

The strain on the sensing elements 150, 155, which are located around the vertical beam 130, indicates the amount of movement of the proof mass. The sensing elements may produce respective output signals which are detected by and analyzed by electronic circuitry shown as 160.

Figure 3:
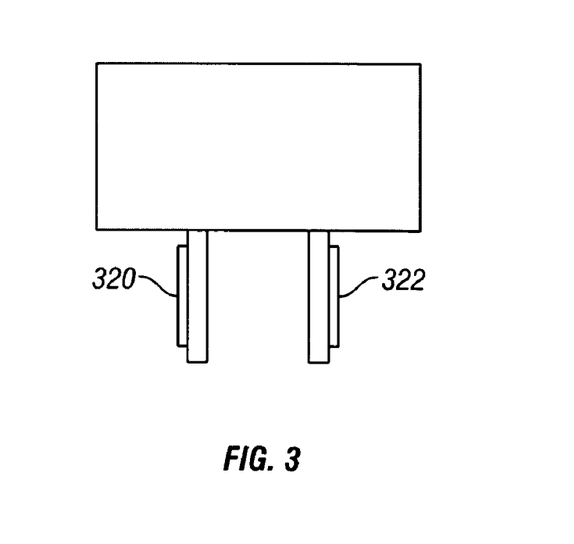
FIG. 3 shows a piezo resistive element on the sensing element.

A first embodiment uses piezoresistive sensing to detect the movement. FIG. 3 shows implanted piezoresistive sensors 320, 322 respectively implanted on the beams 150 and 155. The vibration causes alternate tension and stretching on the sensors. The mode and manner of vibration depends on the resonance of the system. This resonance can be selected to be within a specified range. According to an embodiment, the resonance is selected to be within a range that keeps it within a specified stability control specification, for example, a rollover specification.

FIG. 2 illustrates the different sensitivity between the driving mode resonant frequency and the sensing mode resonant frequency. The driving mode resonant frequency of the rate sensor is 477.5 Hz. FIG. 2 shows how the sensing mode resonant frequency can be selected in the range between 447.6 and 506.7. In an embodiment, a stability control line 200 is selected, and the resonant frequency is maintained between the two edges of that control line. In the exemplary embodiment, the difference between the sensing mode and the driving mode resonant frequency is less than 6.1%, but it should be understood that many different values for this difference are possible.

In order to maintain the standards for a rollover application, the system is much more lenient. The area of rollover specification is shown as 205. In the embodiment, the sensing mode resonant frequency is between 352 and 595 hertz, in order to maintain it within the rollover sensitivity. This only requires a difference between sensing mode and driving mode as being less than 25% or less.

Table 1 illustrates a set of structural design parameters that satisfy the specifications for both stability control and rollover applications

TABLE 1

Structure Design Parameters (for Piezoresistive Sensing)

| Structure parameters | Design values |
| --- | --- |
| Driving beam length (μm) | 53.04 |
| Driving beam width (μm) | 3000 |

TABLE 1-continued

Structure Design Parameters (for Piezoresistive Sensing)

| Structure parameters | Design values |
|---|---|
| ZnO thickness (μm) | 0.3 |
| LPCVD SiN thickness (μm) | 0.1 |
| Decoupling island length (μm) | 100 |
| Decoupling island width (μm) | 3000 |
| Decoupling island thickness (μm) | 530 |
| Tiny beam length (μm) | 50 |
| Tiny beam width (μm) | 3 |
| Tiny beam thickness (μm) | 2 |
| Vertical beam length (μm) | 2000 |
| Vertical beam width (μm) | 35 |
| Vertical beam thickness (μm) | 530 |
| Leg proof mass length (μm) | 1900 |
| Leg proof mass width (μm) | 400 |
| Leg proof mass thickness (μm) | 530 |
| Main proof mass length (μm) | 3000 |
| Main proof mass width (μm) | 3000 |
| Main proof mass thickness (μm) | 530 |
| Driving mode resonant frequency (Hz) | 477.5 |
| Sensing mode resonant frequency (Hz) | 502.5 |
| Sensitivity (V/deg/sec) | $0.00635*V_{supply}$ |

The total size of the sensor chip is 6000 um×3000 um by 530 um. The driving mode resonant frequency is 477.5 Hz. The sensing mode resonant frequency is 502.5. Sensitivity of the angular rate sensor can be up to 0.00635*(V. supply)/degrees/sec.

Table 2 illustrates the structural design parameters which allow the piezoelectric sensing to satisfy the specifications for stability control and rollover applications. Again, the total size of the sensor chip is 6000 μm by 3000 μm by 530 μm. The driving mode resonant frequency is 477.5 Hz and the sensing mode resonant frequency is 498 Hz. The sensitivity of the angular rate sensor can be as high as 0.00608*(V.supply/degrees/seconds).

TABLE 2

Structure Design Parameters (for Piezoelectric Sensing)

| Structure parameters | Design values |
|---|---|
| Driving beam length (μm) | 53.04 |
| Driving beam width (μm) | 3000 |
| ZnO thickness (μm) | 0.3 |
| LPCVD SiN thickness (μm) | 0.1 |
| Decoupling island length (μm) | 100 |
| Decoupling island width (μm) | 3000 |
| Decoupling island thickness (μm) | 530 |
| Tiny beam length (μm) | 50 |
| Tiny beam width (μm) | 10 |
| Tiny beam thickness (μm) | 2 |
| Vertical beam length (μm) | 2000 |
| Vertical beam width (μm) | 34.8 |
| Vertical beam thickness (μm) | 530 |
| Leg proof mass length (μm) | 1900 |
| Leg proof mass width (μm) | 400 |
| Leg proof mass thickness (μm) | 530 |
| Main proof mass length (μm) | 3000 |
| Main proof mass width (μm) | 3000 |
| Main proof mass thickness (μm) | 530 |
| Driving mode resonant frequency (Hz) | 477.5 |
| Sensing mode resonant frequency (Hz) | 498 |
| Sensitivity (V/deg/sec) | $0.00608*V_{supply}$ |

This system can satisfy the specifications for automotive stability and rollover controls. Moreover, the fundamental resonant frequency of the sensor can be around 500 Hz in order to satisfy the specification that the frequency response should be between 10 and 50 Hz.

The sensing signal is from two different elements 150 and 155. Effectively that sensing signal is a differential mode signal where one beam receives tensile stress and the other beam receives compressive stress. Because of this, the system is not sensitive to vertical vibration and acceleration. These vibrations produce a common mode signal on the two sensing beans which cancel each other out.

Another aspect describes embodiments to mitigate the vibration susceptibility of this sensor.

A first embodiment takes advantage of the resonance and drives the resonant frequency of the driving mode of the sensor within a specified range that is outside the range of expected vibration and hence provides some vibration independence. For example, the driving mode resonant frequency may be set to around 3000 Hz, taking it about 1000 Hz away from the vibration environment frequency range of 20-2000 Hz.

This embodiment may use a PZT film instead of zinc oxide as the piezoelectric driver, to provide a higher $d_{31}$. More specifically, by selecting the sensing mode resonant frequency to be within the range of 2300 to 4000 Hz, this also maintains the frequency outside the specification for automobile stability control.

In this embodiment, the difference between the sensing mode and the driving mode resonant frequency is less than 23%. If only the vertical beam is changed, while the other structural parameters are kept the same this can use a vertical beam having a size between 96.6 and 140.4 μm.

Table 3 satisfies the specification for both stability control and rollover applications. The total size of the sensor chip is around 6000 μm×3000 μm×530 μm. The targeted driving mode and sensing mode resonant frequencies are around 3000 and 3500 Hz, respectively. The sensitivity of the angular rate sensor can be up to 0.0102*Vsupply/degrees/seconds.

TABLE 3

Structure design parameters (piezoelectric driving and piezoresistive sensing).

| Structure parameters | Design values |
|---|---|
| Driving beam length (μm) | 77.7 |
| Driving beam width (μm) | 3000 |
| PZT thickness (μm) | 2 |
| LPCVD SiN thickness (μm) | 0.93 |
| Decoupling island length (μm) | 100 |
| Decoupling island width (μm) | 3000 |
| Decoupling island thickness (μm) | 530 |
| Tiny beam length (μm) | 50 |
| Tiny beam width (μm) | 3 |
| Tiny beam thickness (μm) | 2 |
| Vertical beam length (μm) | 2000 |
| Vertical beam width (μm) | 128 |
| Vertical beam thickness (μm) | 530 |
| Leg proof mass length (μm) | 1900 |
| Leg proof mass width (μm) | 400 |
| Leg proof mass thickness (μm) | 530 |
| Main proof mass length (μm) | 3000 |
| Main proof mass width (μm) | 3000 |
| Main proof mass thickness (μm) | 530 |
| Driving mode resonant frequency (Hz) | 3000 |
| Sensing mode resonant frequency (Hz) | 3500 |
| Sensitivity (V/deg/sec) | $0.0102*V_{supply}$ |

A second embodiment of vibration independence is explained with reference to FIGS. 4A and 4B.

In-phase oscillations may cause vibrations along the z-axis to be transmitted via the anchor block and from there, into the sensor's supporting structure. This type and magnitude of vibration could be transmitted into the electronics PCB where it can cause electronic component failures and other undesirable effects. Transmitted vibrations are, therefore undesirable. An embodiment changes the driven oscillation mode to one where each mass is induced to vibrate with a 180 degrees phase shift with respect to each other. That is, both masses will vibrate at the same frequency. However, when one mass is at its maximum deflected position in the +Z direction, the other mass is at its maximum deflected position in the −Z direction.

Figure 4A:
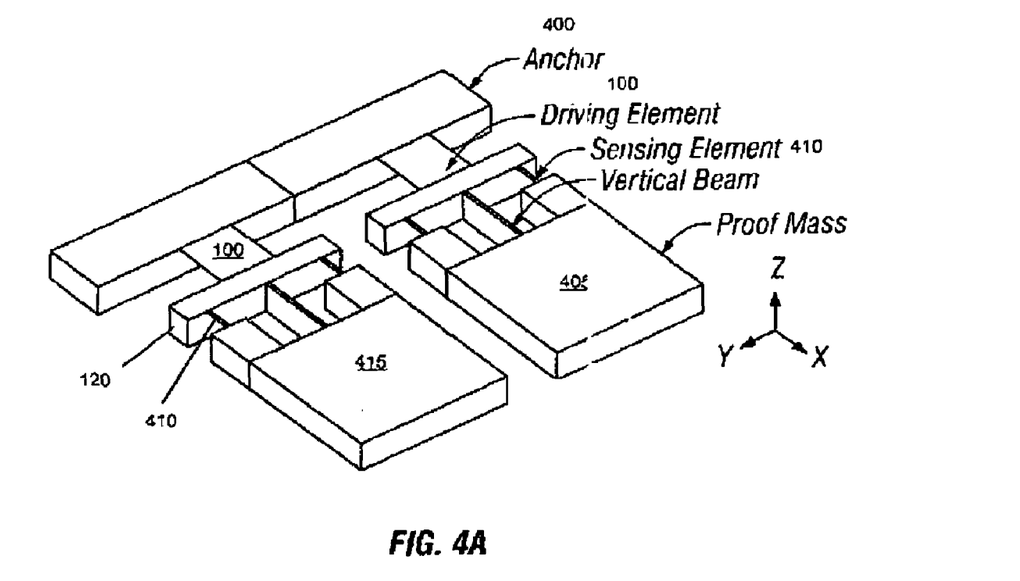
FIGS. 4a and 4b show an anti-phase vibration mitigation embodiment.
Figure 4B:
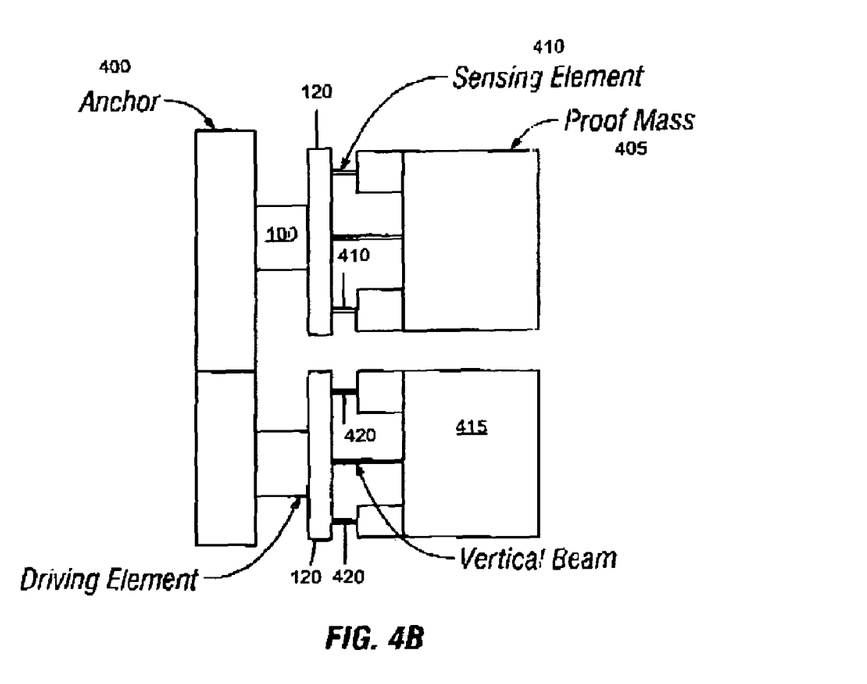

FIGS. 4A and 4B show a twin mass angular rate sensor which provides anti phase drive vibration mechanisms. Proof masses 405, 415 are provided on both sides of the anchor 400. A first mass 405 is connected to a first sensor 410 and a second mass 415 is connected to a second sensor 420. The masses 405 and 415 are driven to drive in anti phase modes. Environmental vibration along the z axis can produce extra movement, other than the vibration amplitude. The vibration amplitudes $A_{d1}$ and $A_{d2}$ along the z direction of the proof masses 405 and 415 can be described according to equations 1 and 2, respectively:

$$A_{d1} = A_d + B \quad (1)$$

$$A_{d2} = -A_d + B \quad (2)$$

where $A_d$ represents the driving amplitude of each proof mass caused by the respective driving element 100 and B represents the extra movement along the z direction on each proof mass caused by the environmental vibration. The extra movement B in one proof mass is in phase with the extra movement in the other proof mass.

From equation 1, it follows that:

$$A_{s1} = \frac{F_0}{k_d} \cdot \frac{2 \cdot \Omega \cdot Q_d \cdot \omega_d}{\omega_s^2 \cdot \sqrt{\left(1 - \frac{\omega_d^2}{\omega_s^2}\right)^2 + \frac{1}{Q_s^2} \cdot \frac{\omega_d^2}{\omega_s^2}}}$$

$$= (A_d + B) \cdot \frac{2 \cdot \Omega \cdot \omega_d}{\omega_s^2 \cdot \sqrt{\left(1 - \frac{\omega_d^2}{\omega_s^2}\right)^2 + \frac{1}{Q_s^2} \cdot \frac{\omega_d^2}{\omega_s^2}}}$$

$$= (A_d + B) \cdot G$$

$$A_{s2} = \frac{F_0}{k_d} \cdot \frac{2 \cdot \Omega \cdot Q_d \cdot \omega_d}{\omega_s^2 \cdot \sqrt{\left(1 - \frac{\omega_d^2}{\omega_s^2}\right)^2 + \frac{1}{Q_s^2} \cdot \frac{\omega_d^2}{\omega_s^2}}}$$

$$= (-A_d + B) \cdot \frac{2 \cdot \Omega \cdot \omega_d}{\omega_s^2 \cdot \sqrt{\left(1 - \frac{\omega_d^2}{\omega_s^2}\right)^2 + \frac{1}{Q_s^2} \cdot \frac{\omega_d^2}{\omega_s^2}}}$$

$$= (-A_d + B) \cdot G$$

$$V_{out1} = S \cdot (A_d + B) \cdot G \quad (3)$$
$$V_{out2} = S \cdot (-A_d + B) \cdot G$$
$$V_{out} = V_{out1} - V_{out2} = 2 \cdot S \cdot A_d \cdot G$$

Equation 3 shows that the vibration amplitude produced by the environmental vibration is canceled out, thereby providing vibration independence.

Figure 5:
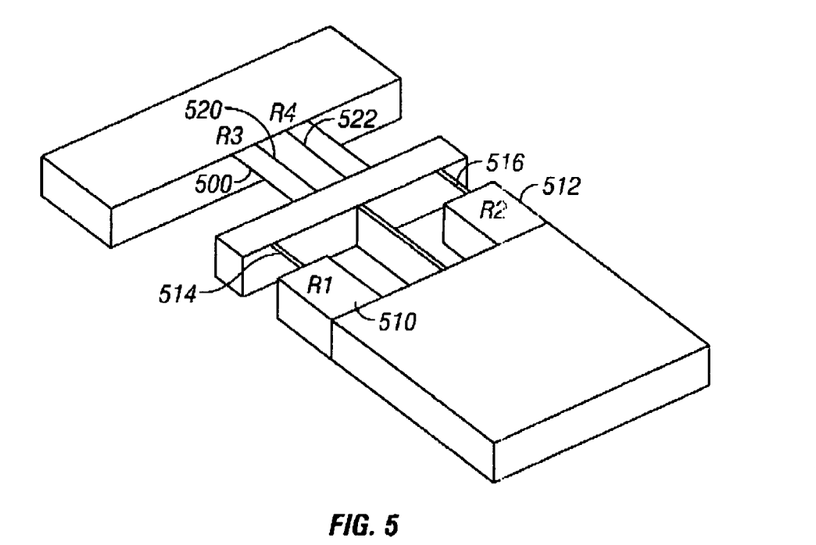
FIG. 5 shows an embodiment using a Wheatstone bridge system.

Another embodiment shown in FIG. 5 uses a phase difference detector. The previous embodiments assume the output of the angular rate sensor to be related to the vibration amplitude of the driving mode in the sensing mode and also to be susceptible to environmental vibration. In this embodiment, a new angular rate detecting technique is based on detection of the phase difference.

In this embodiment, the driving element 500 uses silicon thin beams 520, 522, in place of the silicon nitride parts used in other embodiments. As in these other embodiments, this embodiment uses resistive sensors 510, 512 on the sensing element beams 514, 516, respectively. The additional pair of piezoresistors 520, 522 are used as R3 and R4, on the silicon flat beam.

The resistors R1/R3 forms a first half Wheatstone bridge, and the resistors R2/R4 form the other half Wheatstone bridge. Each produces an output voltage. In the embodiment, each of the four resistors has a resistance value of R when unstrained. The difference between the base value R, and the strained value, produces the output voltages as follows.

The driving amplitude:

$$X = A_d \sin(\omega t) \quad (4)$$

The sensing amplitude:

$$Y = A_s \cos(\omega t) \quad (5)$$

$$A_s = \frac{F_0}{k_d} \cdot \frac{2 \cdot \Omega \cdot Q_d \cdot \omega_d}{\omega_s^2 \cdot \sqrt{\left(1 - \frac{\omega_d^2}{\omega_s^2}\right)^2 + \frac{1}{Q_s^2} \cdot \frac{\omega_d^2}{\omega_s^2}}} \quad (6)$$

$$= A_d \cdot \frac{2 \cdot \Omega \cdot \omega_d}{\omega_s^2 \cdot \sqrt{\left(1 - \frac{\omega_d^2}{\omega_s^2}\right)^2 + \frac{1}{Q_s^2} \cdot \frac{\omega_d^2}{\omega_s^2}}}$$

$$= A_d \cdot G \cdot \Omega$$

$$\frac{\Delta R_3}{R} = \frac{\Delta R_4}{R} = \frac{\pi_{44}}{2} \cdot S_1 \cdot A_d \cdot \omega^2 \cdot \sin(\omega t) \quad (7)$$

$$\frac{\Delta R_1}{R} = \frac{\pi_{44}}{2} \cdot S_2 \cdot A_s \cdot \omega^2 \cdot \cos(\omega t)$$

$$\frac{\Delta R_2}{R} = -\frac{\pi_{44}}{2} \cdot S_2 \cdot A_s \cdot \omega^2 \cdot \cos(\omega t)$$

The outputs from the two half Wheatstone bridges:

$$V_{out1} = V_{in} \cdot \frac{\Delta R_3 - \Delta R_1}{\left(2 + \frac{\Delta R_3}{R}\right) \cdot \left(2 + \frac{\Delta R_1}{R}\right)} \quad (8)$$

$$V_{out2} = V_{in} \cdot \frac{\Delta R_4 - \Delta R_2}{\left(2 + \frac{\Delta R_4}{R}\right) \cdot \left(2 + \frac{\Delta R_2}{R}\right)}$$

The phases of $V_{out1}$ and $V_{out2}$ when $V_{out1}$ and $V_{out2}$ are equal to 0:

$$V_{out1} = 0 \Rightarrow \Delta R_3 = \Delta R_1 \Rightarrow \beta_1 = \omega t_1 = \arctan\left(\frac{S_2 \cdot A_s}{S_1 \cdot A_d}\right) \quad (9)$$

$$V_{out2} = 0 \Rightarrow \Delta R_4 = \Delta R_2 \Rightarrow \beta_2 = \omega t_2 = -\arctan\left(\frac{S_2 \cdot A_s}{S_1 \cdot A_d}\right)$$

The phase difference:

$$\beta_1 - \beta_2 = 2 \cdot \arctan\left(\frac{S_2 \cdot A_s}{S_1 \cdot A_d}\right) \approx 2 \cdot \frac{S_2 \cdot A_s}{S_1 \cdot A_d} = 2 \cdot \frac{S_2}{S_1} \cdot G \cdot \Omega \quad (10)$$

The phase difference is proportional to the angular rate $\Omega$ and is not related to the vibration amplitude. $S_1$, $S_2$ and G are determined by the structural parameters, driving frequency, resonant frequency of sensing mode, and quality factor. Thus, the phase-difference detecting scheme can reduce the sensitivity to environmental vibrations.

Figure 6:
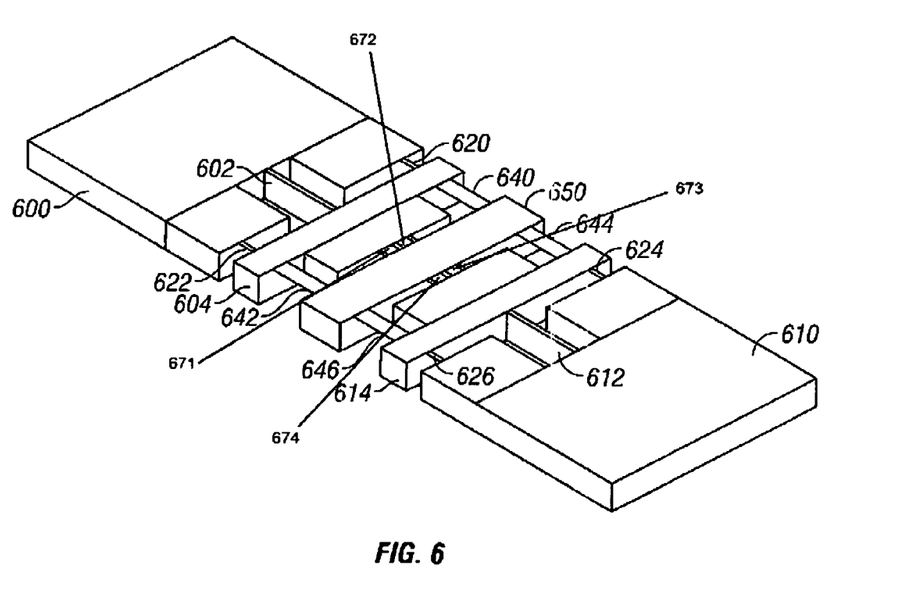
FIG. 6 shows a three-axis accelerometer.

Another embodiment describes a three axis accelerometer. The three axis accelerator uses two masses to sense acceleration along three orthogonal axes. The embodiment includes two symmetric parts, each of which includes a proof mass, shown as proof mass 1 (600) and a proof mass 2 (610). Each part also includes one vertical beam (602 and 612), one decoupling island (604, 614), and two sensing beams (620, 622 and 624, 626). The sensing beams (620, 622 and 624, 626) can sense as described in previous embodiments. In this embodiment, piezoelectric films can be deposited on the sensing beams to allow piezoelectric sensing. The sensing beams 620, 622, 624, 626 sense the movement in the "y" direction, as described herein.

Coupling beams 640, 642 connect the decoupling island 604 to anchor 650, which holds the first and second parts together. Analogously, the coupling beams 644, 646 connect the other decoupling island 614 to the anchor 650. The anchor 650 connects to two groups of sensors—a first group sensitive to the x-axis acceleration, and a second group sensitive to the z axis acceleration. These two group of sensors are implemented in sensing beams 671 and 672 coupled between the decoupling island 604 and the anchor 650 and sensing beams 672 and 673 coupled between the decoupling island 614 and the anchor 650. As shown in FIGS. 9B and 9C, the sensing beams 671, 672, 673 and 674 include eight sensing resistors R1-R8 for sensing the accelerations in the x and z directions. The sensing beam 672 includes the first sensing resistor R1 at one end in contact with the decoupling island 604 and the second sensing resistor R2 at the other end in contact with the anchor 650. The sensing beam 673 includes the third sensing resistor R3 at one end in contact with the anchor 650 and the fourth sensing resistor R4 at the other end in contact with the decoupling island 614. The sensing beam 671 includes the fifth sensing resistor R5 at one end in contact with the decoupling island 604 and the sixth sensing resistor R6 at the other end in contact with the anchor 650. The sensing beam 674 includes the seventh sensing resistor R7 at one end in contact with the anchor 650 and the eighth sensing resistor R8 at the other end in contact with the decoupling island 614. Operations of these sensors are illustrated in FIGS. 9A-9C and 10A-10D.

The supporting beams 640, 642, 644, 646 are separated from the sensing elements 620, 622, 624, 626. This may optimize the sensing elements and the. supporting beam separately in order to satisfy bandwidth requirements and maximize the sensitivity. Cross axis sensitivity can also be minimized. Tables 4 and 5 show the parameters of an embodiment.

TABLE 4

Structure design parameters and calculated output (Y-axis sensing).

| Structure parameters | Design values |
| --- | --- |
| Tiny beam 3 length (μm) | 10 |
| Tiny beam 3 width (μm) | 2 |
| Tiny beam 3 thickness (μm) | 2 |
| Vertical beam length (μm) | 2000 |
| Vertical beam width (μm) | 28 |
| Vertical beam thickness (μm) | 530 |
| Leg proof mass length (μm) | 1900 |
| Leg proof mass width (μm) | 400 |
| Leg proof mass thickness (μm) | 530 |
| Main proof mass length (μm) | 3000 |
| Main proof mass width (μm) | 3000 |

TABLE 4-continued

Structure design parameters and calculated output (Y-axis sensing).

| Structure parameters | Design values |
| --- | --- |
| Main proof mass thickness (μm) | 530 |
| Resonant frequency (Hz) | 359.7 |
| Y-axis Sensitivity (mV/g/5 V) | 1727 |
| Y-axis minimum detectable signal (g) | 0.0001 |
| Cross-axis sensitivity (X-axis acceleration, Y-axis sensing) | Close to zero |
| Cross-axis sensitivity (Z-axis acceleration, Y-axis sensing) | Close to zero |

TABLE 5

Structure design parameters and calculated output (Z-axis and X-axis sensing).

| Structure parameters | Design values |
| --- | --- |
| Flat beam length (μm) | 260 |
| Flat beam width (μm) | 150 |
| Flat beam thickness (μm) | 12 |
| Tiny beam 1 length (μm) | 10 |
| Tiny beam 1 width (μm) | 2 |
| Tiny beam 1 thickness (μm) | 2 |
| Tiny beam 2 length (μm) | 10 |
| Tiny beam 2 width (μm) | 10 |
| Tiny beam 2 thickness (μm) | 2 |
| Tiny beam 3 length (μm) | 10 |
| Tiny beam 3 width (μm) | 2 |
| Tiny beam 3 thickness (μm) | 2 |
| Vertical beam length (μm) | 2000 |
| Vertical beam width (μm) | 28 |
| Vertical beam thickness (μm) | 530 |
| Leg proof mass length (μm) | 1900 |
| Leg proof mass width (μm) | 400 |
| Leg proof mass thickness (μm) | 530 |
| Main proof mass length (μm) | 3000 |
| Main proof mass width (μm) | 3000 |
| Main proof mass thickness (μm) | 530 |
| Resonant frequency (Hz) | 207.35 |
| Z-axis Sensitivity (mV/g/5 V) | 988.5 |
| Z-axis minimum detectable signal (g) | 0.0002 |
| Cross-axis sensitivity (X-axis acceleration, Z-axis sensing) | Close to zero |
| Cross-axis sensitivity (Y-axis acceleration, Z-axis sensing) | 0.33% |
| X-axis Sensitivity (mV/g/5 V) | 148.3 |
| X-axis minimum detectable signal (g) | 0.0012 |
| Cross-axis sensitivity (Z-axis acceleration, X-axis sensing) | Close to zero |
| Cross-axis sensitivity (Y-axis acceleration, X-axis sensing) | 2.2% |

Therefore, in summary, the Three-axis Accelerometer with Piezoresistive Sensing can have the following characteristics:
(1) input voltage: 5V
   current can be less than 5 mA
(2) un-amplified sensitivity:
   X-axis: 148.3 mV/g/5V
   Y-axis: 1727 mV/g/5V
   Z-axis: 988.5 mV/g/5V
(3) Minimum detectable signal:
   X-axis: 0.0012 g
   Y-axis: 0.0001 g
   Z-axis: 0.0002 g
(4) cross-axis sensitivity: <2.2%
(5) Bandwidth: DC-70 Hz
(6) Shock survival: need to include shock protection structure appropriate to the package.

The support beams contribute mainly to the resonant frequency of the accelerometer, while the sensing beams affects its sensitivity. This provides the flexibility to optimize the structure parameters of the support beam and sensing beam to maximize the figure of merit (i.e., sensitivity*$\omega^2$).

For example, the vertical beam 602, 612 is the support beam for Y-axis acceleration sensing, while the sensing beams, also called "tiny beams" because of their thin construction in certain embodiments, are on both sides of the vertical beam 620, 622, 624, 626.

The thickness and other structural parameters of the vertical beam 602, 612 may be determined by the resonant frequency and bandwidth requirement for a specific application. The thickness of the vertical beam, and also the length and width of the vertical beam, as well as the two sensing beams to some minor degree, may effect the resonant frequency.

In the structure-parameter design summarized in Table 4, the width of the vertical beam is chosen to be 28 µm. This vertical beam thickness can be achieved with Deep Reactive Ion Etching (DRIE). The sensitivity is determined by the thickness, length, width and thickness of the tiny sensing beam with trade-off among those parts.

Table 5 shows selecting the thickness of the tiny beam to be 2 micron, which can be achieved by using silicon wafers with 2 µm thick N-type epitaxial layer on a P-type substrate. In an alternative embodiment, these may use silicon-on-insulator wafers. Electrochemical etching can be used to etch the P substrate, so that the etching stops exactly at the P-N junction of the epi wafer, leaving a 2 µm thick N-type diaphragm or beams with very good uniformity and repeatability.

Figure 8:
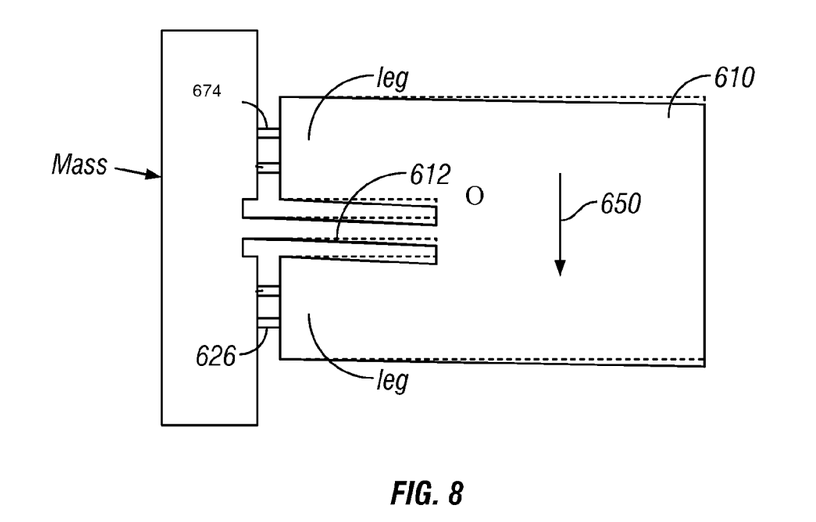
FIG. 8 illustrates the y-axis acceleration sensing of the accelerometer.

FIG. 8 illustrates a schematic view of the y axis acceleration. The mass 610 is driven in the y direction 650 by the external acceleration to be detected. The acceleration in the direction of the arrow 650 causes deflection of the supporting beam 612, and correspondingly causes the sensor 626 to be compressed, and causes the sensor 624 to be stretched.

The structure 612 has a rectangular shape to constrain the movement of the mass 610 to the y axis. This forces substantially pure compression on-the sensor 626; and substantially pure tension on the other sensor 624.

Figure 9A:
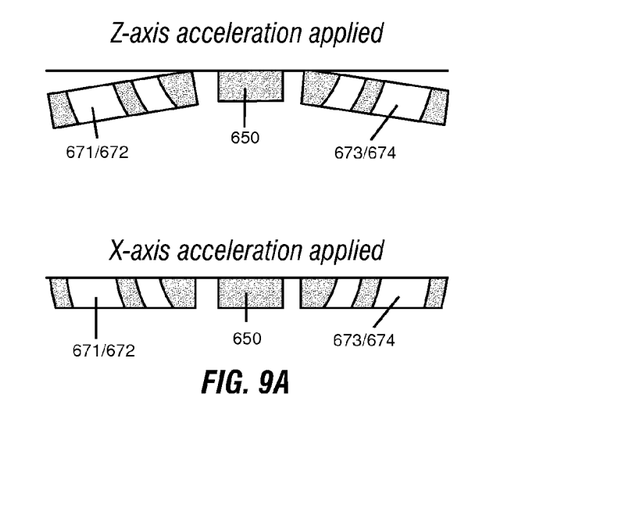
FIGS. 9a-9C illustrate the x and z axis acceleration sensing of the accelerometer.
Figure 9B:
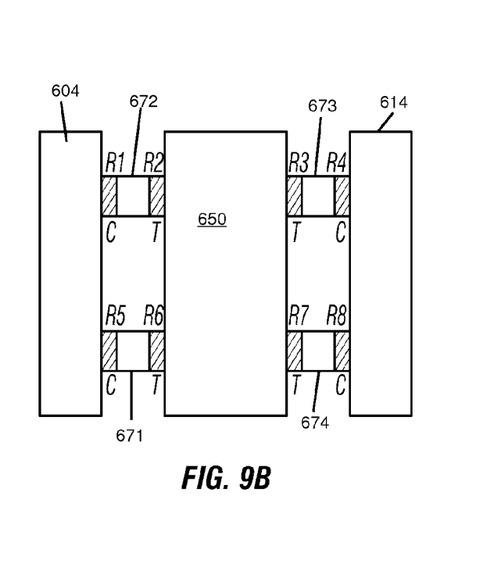
Figure 9C:
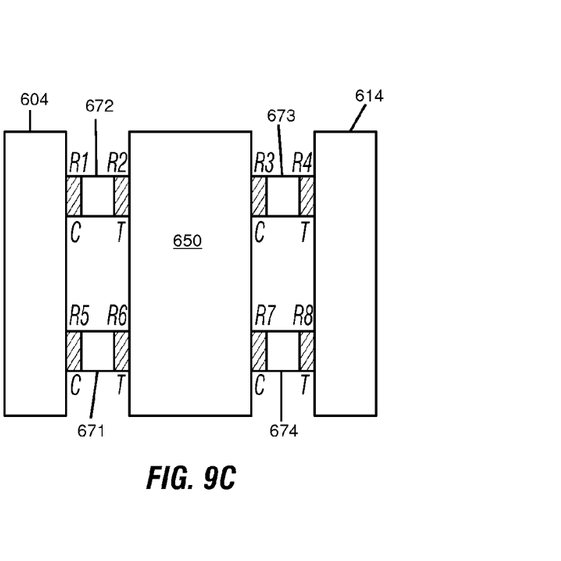

FIGS. 9a-9c show a force distribution of the FIG. 6 tri-axis sensor in sensing accelerations in the x and y directions based on the sensing resistors R1-R8. FIG. 9a shows an exaggerated view of the results of the force on the sensor. The upper illustration in FIG. 9a shows that the Z axis acceleration causes both masses 600 and 610 on two sides of the anchor 650 to move in an opposite direction of the Z-axis acceleration, and produces symmetric stress distribution between the sensing beams 671 and 672 on one side of the anchor 650 and the sensing beams 673 and 674 on the other side of the anchor 650. The lower illustration in FIG. 9a shows that the X axis acceleration produces antisymmetric force distribution between the sensing beams 671 and 672 on one side of the anchor 650 and the sensing beams 673 and 674 on the other side of the anchor 650. Therefore, x-axis acceleration may produce a different distribution of voltages than the z axis acceleration. FIGS. 9B and 9C illustrate the sensing resistors R1-R8 at the different locations under a Z-axis acceleration condition and a X-axis acceleration condition, respectively, with resistors labeled as "T" referring to resistors that sense tension, and resistors labeled "C" representing resistors which sense compression.

Figure 10A:
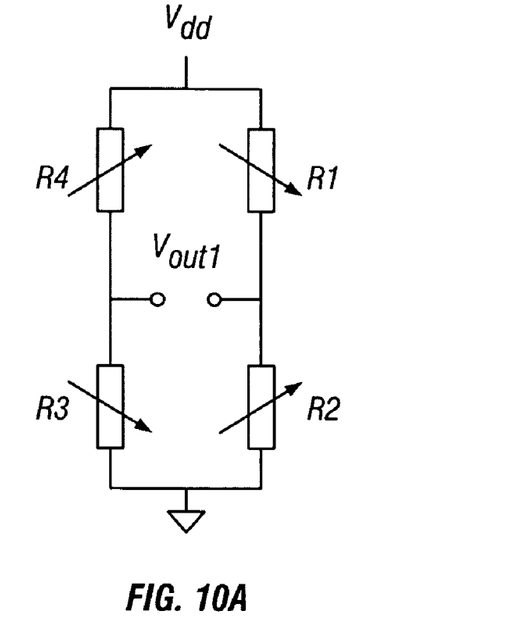
FIGS. 10a-10d illustrate how the Wheatstone bridges can sense the acceleration parameters.
Figure 10B:
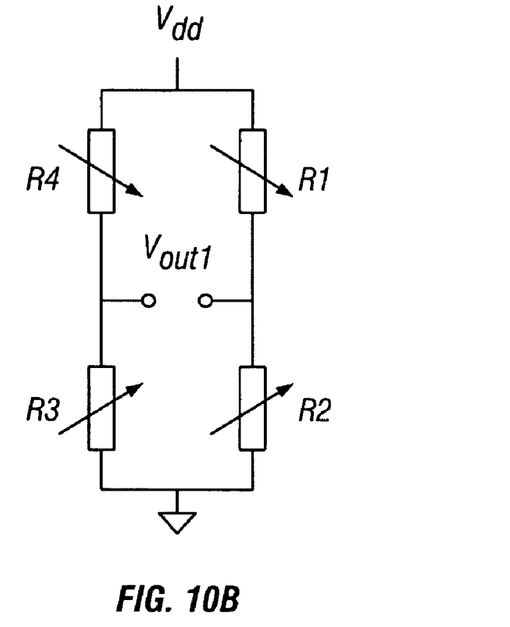
Figure 10C:
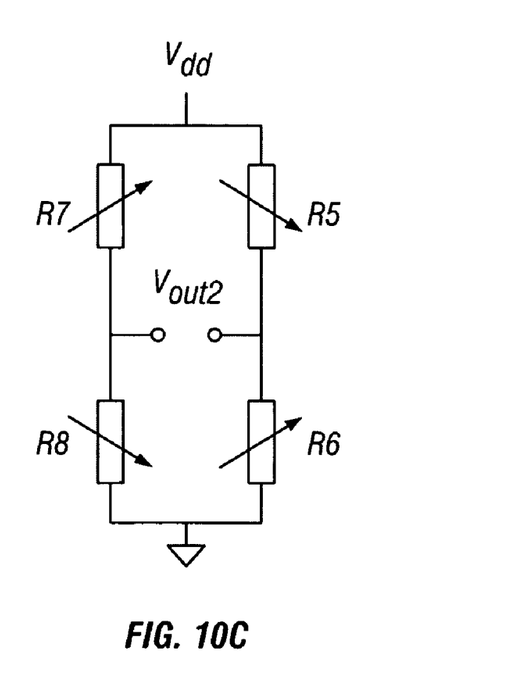
Figure 10D:
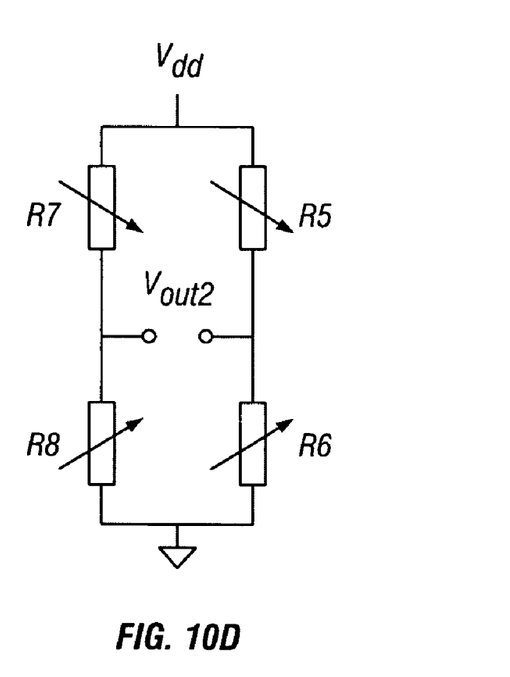

FIGS. 10a-10d illustrate how these resistances, formed into a Wheatstone Bridge configuration, can be connected to sense the different kinds of acceleration in the X and Z directions. FIG. 10a shows how when x axis acceleration is applied, the output voltage Vout1 from the resistances R1-R4 that are in the two sensing beams 672 and 673 on two sides of the anchor 650 and are electrically connected in a Wheatstone Bridge configuration is proportional to that acceleration. However, the output voltage from those same resistors R1-R4 is zero when z-axis acceleration is applied, as illustrated in FIG. 10b. The Wheatstone bridge formed by resistors R5-R8 produces an output voltage Vout2 for sensing Z-axis acceleration as shown in FIGS. 10c and 10d. FIG. 10c shows that, under an acceleration in the Z direction, the Vout2 is proportional to a z-axis acceleration. The x-axis acceleration causes a 0 output for Vout2 for the Wheatstone bridge formed by resistors R5-R8.

In order to optimize parameters of the device, a finite element analysis of the device may be carried out for the twin mass structure. When 1 G of acceleration is applied, stresses as high as 390 MPa can be achieved. Sensitivity can be up to 257 mV per G per V, and resonant frequency can be as high as 333 Hz. One G of Y axis acceleration produces minimal stress on the x and z axis. Therefore, there is minimal cross beam sensitivity.

The stress on the sensing beams can be up to 180 MPa. Device function and structure may be improved by optimizing the structural parameters such that the asymmetric stress distribution on the beam is minimized.

Figure 11A:
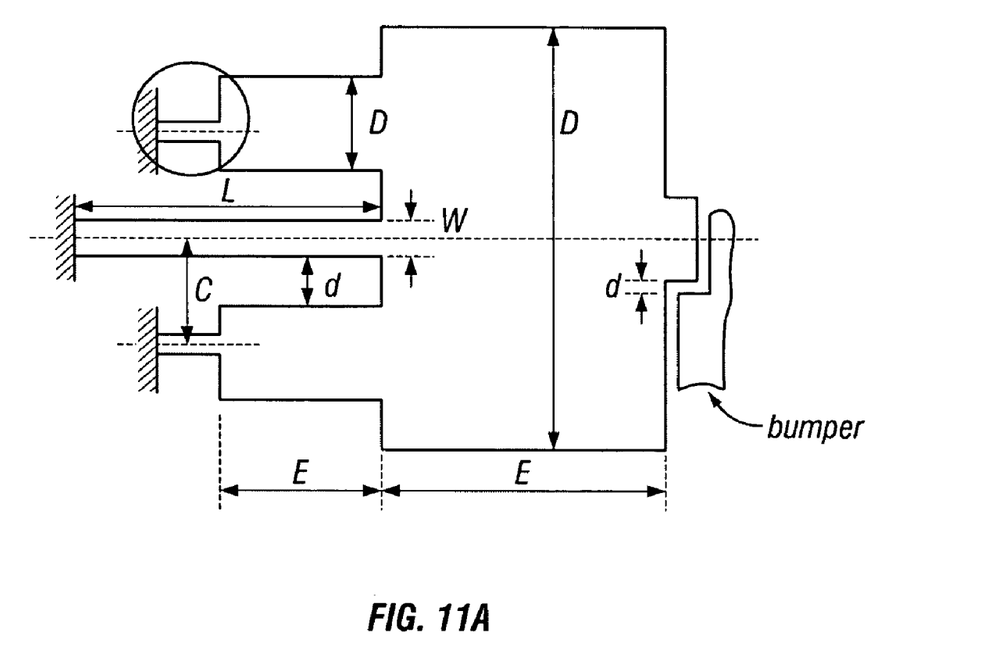
FIGS. 11a and 11b illustrate shock survival techniques for the sensor.
Figure 11B:
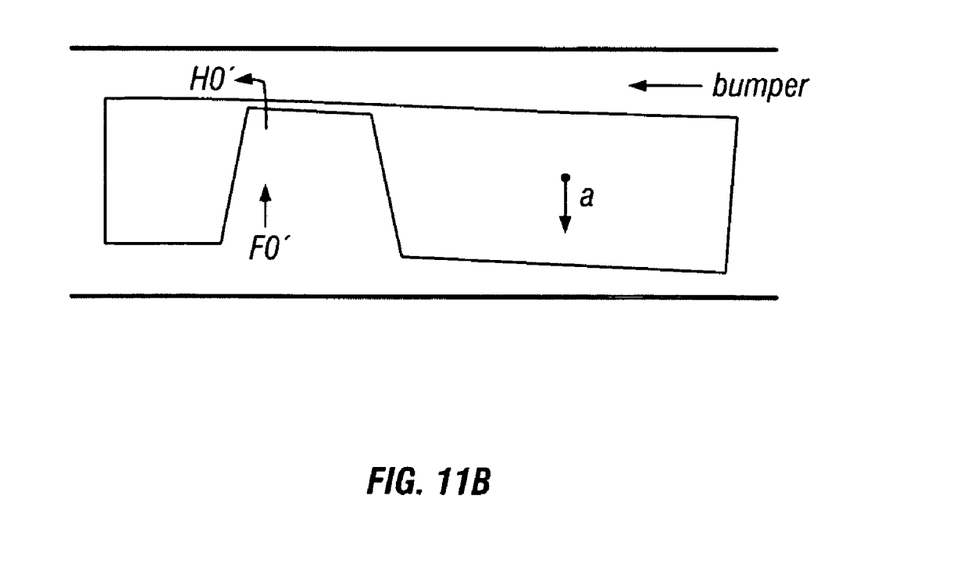

Even higher stresses may cause damage if the stress is high enough to exceed the structural limits of the system FIGS. 11A and 11B respectively illustrate in-plane bumpers and out of plane bumpers. For example, 10,000 G's of shock survival can be obtained through proper in plane and out of plane bumper design.

FIGS. 7a-7f illustrate the device formation, with each figure illustrating both a side view and cross-sectional view of each step.

Figure 7A:
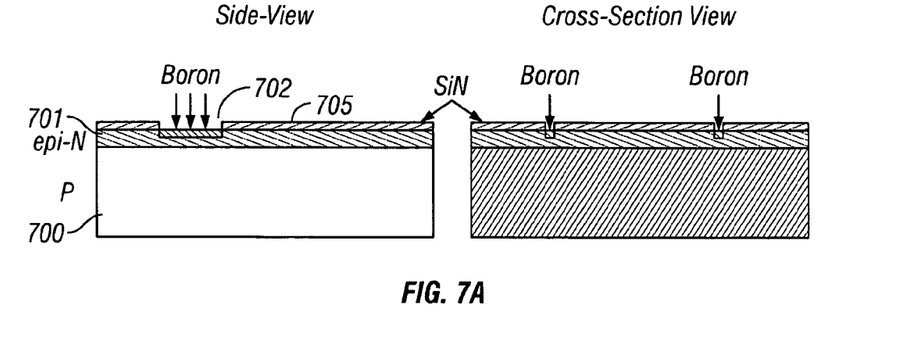
FIGS. 7A-7E show brief processing steps to form the sensor.

FIG. 7a illustrates a first operation. A P type silicon substrate 700 with an epitaxial layer 701 is deposited with a layer of silicon nitride. Low dose boron is implanted in at least one hole 702 in silicon nitride layer 705 to form piezo resistors. The epitaxial layer can be 2-3 µm thick, and can be an n type epitaxial layer on a p type substrate. An electrochemical self etching stop can be used to form the tiny sensing beans in this way.

Figure 7B:
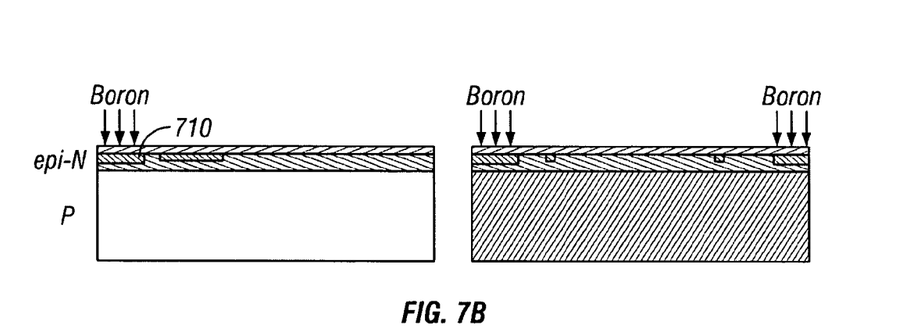

After the initial low dose boron ion implantation, a higher dose boron ion implantation is used to form the ohmic contacts 710 as shown in FIG. 7B.

Figure 7C:
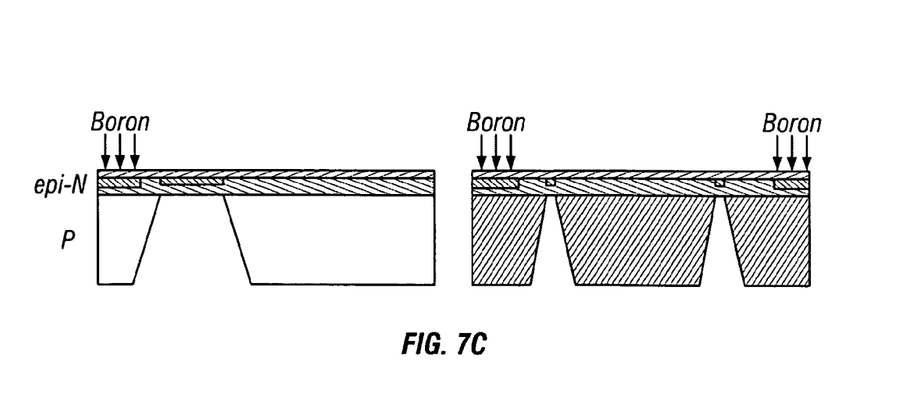
Figure 7D:
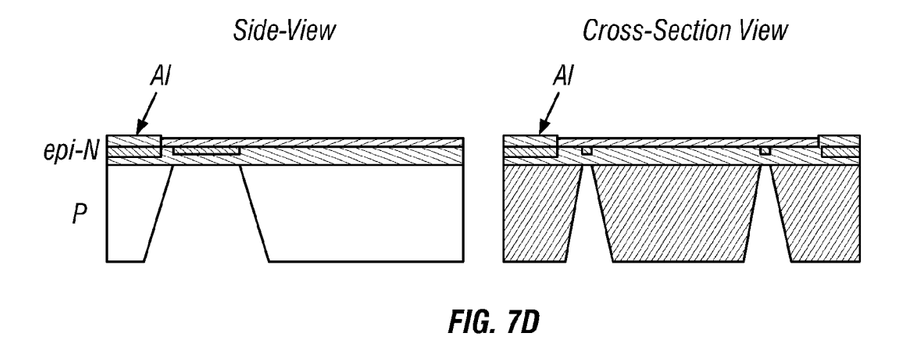

The low dose boron parts are used as etch stops in FIG. 7C, to form a thin silicon diaphragm and the tiny sensing beam.

Figure 7E:
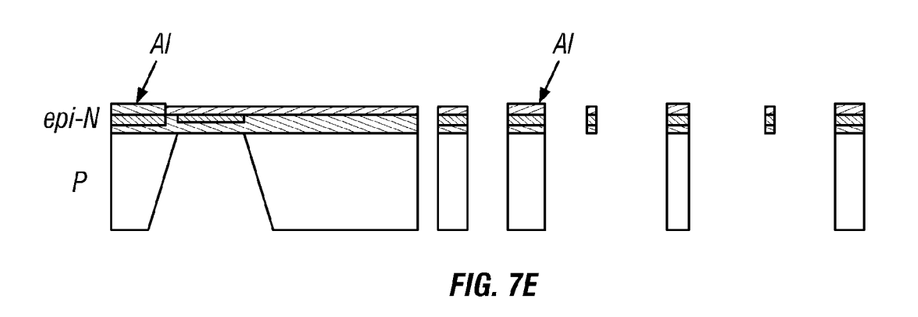

FIG. 7E shows depositing aluminum to form an electrode connection pattern. Finally, deep ion reactive ion etching is used to form the vertical beams and to release the device.

The sensors described herein may produce their outputs to be displayed on any kind of display, e.g., an analog dial or a digital display. The outputs may also be processed by one or computers which may be any kind of computer, either general purpose, or some specific purpose computer such as a workstation. The computer may be a Pentium class computer, running Windows XP or Linux, or may be a McIntosh computer. The programs may be written in C, or Java, or any other programming language. The programs may be resident on a storage medium, e.g., magnetic or optical, e.g. the computer hard drive, a removable disk or other removable medium. The programs and the data may also be run over a network.

Although only a few embodiments have been disclosed in detail above, other embodiments are possible and are intended to be encompassed within this specification. The specification describes specific examples to accomplish a more general goal that may be accomplished in other way. This disclosure is intended to be exemplary, and the claims are intended to cover any modification or alternative which might be predictable to a person having ordinary skill in the art.

For example, the above has described certain parameters with reference to x, y, z orthogonal axes. It should be understood that the parameters can be sensed in different ways. In addition, the above has described different kinds of driving and sensing mechanisms, for example it has described piezo based driving mechanisms, and piezo resistive (as well as piezoelectric) based sensing mechanisms. It should be understood that other driving mechanisms, including magnetic, and other driving mechanisms can be used. Moreover, the sensor can be any kind of sensor.

The above has also described an embodiment formed using MEMS, but it should be understood that other formation techniques can be used.

Also, only those claims which use the words "means for" are intended to be interpreted under 35 USC 112, sixth paragraph. Moreover, no limitations from the specification are intended to be read into any claims, unless those limitations are expressly included in the claims.

What is claimed is:

1. A three axis sensor, comprising:
a first sensor element, comprising:
a first mass, defining an outer perimeter;
a first support for the first mass, which constrains the first mass to vibrate in a specified plane, connected to a connection surface of said first mass; and
a first sensing element that detects vibration of said first mass substantially only in said specified plane along a first direction, said vibration being detected relative to said first support;
a first decoupling island connected to one end of the first support which has an opposite end coupled to and holding the first mass, wherein the first sensing element is coupled between the first mass and the first decoupling island;
an anchor;
first coupling beams coupled between the anchor and the first decoupling island to hold the first decoupling island to the anchor and to constrain the first decoupling island to move in a second direction perpendicular to the specified plane;
a second mass located on one side of the anchor opposite to the first mass;
a second support for the second mass, a second sensing element, and a second decoupling island that are connected in a configuration similar to the first support, the first sensing element and the first decoupling island for the first mass in a way that constrains the second mass in the specified plane;
second coupling beams coupled between the anchor and the second decoupling island to hold the second decoupling island to the anchor and to constrain the second decoupling island to move in the second direction perpendicular to the specified plane;
first sensing beams coupled between the first decoupling island and the anchor to sense relative motion of the first decoupling island relative to the anchor; and
second sensing beams coupled between the second decoupling island and the anchor to sense relative motion of the second decoupling island relative to the anchor, wherein the first and second sensing beams are electrically connected to form a sensing Wheatstone bridge circuit to detect motion of the sensor in the second direction and a third direction that are perpendicular to each other and to the first direction in the specified plane in which the first mass and the second mass are confined to move.

2. A sensor as in claim 1, wherein each of the first and second sensing beams comprises two sensing resistors.

3. A sensor as in claim 2, wherein the first sensing beams include two first sensing beams and the second sensing beams include two second sensing beams, and wherein the sensing resistors in the two first sensing beams and the second sensing beams are connected to form a first sensing Wheatstone bridge as part of the sensing Wheatstone bridge circuit to detect an acceleration in the second direction and a second sensing Wheatstone bridge as part of the sensing Wheatstone bridge circuit to detect an acceleration in the third direction.

4. A sensor as in claim 3, wherein said first sensing element includes first and second sensing parts, adjacent to first and second parts of the first mass to detect vibration of the first mass.

* * * * *

UNITED STATES PATENT AND TRADEMARK OFFICE
CERTIFICATE OF CORRECTION

| | |
|---|---|
| PATENT NO. | : 7,481,112 B2 |
| APPLICATION NO. | : 11/240804 |
| DATED | : January 27, 2009 |
| INVENTOR(S) | : Eun Sok Kim and Qiang Zou |

It is certified that error appears in the above-identified patent and that said Letters Patent is hereby corrected as shown below:

Column 1, line 3, insert --CROSS-REFERENCE TO RELATED APPLICATIONS--;

IN THE CLAIMS:

Column 12, line 38 (Claim 4), delete "A sensor as in claim 3," and insert --A sensor as in claim 1,--.

Signed and Sealed this

Seventeenth Day of March, 2009

JOHN DOLL
*Acting Director of the United States Patent and Trademark Office*